(12) United States Patent
Naka

(10) Patent No.: US 7,936,425 B2
(45) Date of Patent: May 3, 2011

(54) TRANSFLECTIVE LIQUID CRYSTAL DISPLAY DEVICE INCLUDING LIQUID CRYSTAL FILM WITH A NEMATIC HYBRID ORIENTATION FORMED ON A SUBSTRATE

(75) Inventor: Kenichirou Naka, Kanagawa (JP)

(73) Assignee: NEC LCD Technologies, Ltd., Kawasaki, Kanagawa (JP)

( * ) Notice: Subject to any disclaimer, the term of this patent is extended or adjusted under 35 U.S.C. 154(b) by 1178 days.

(21) Appl. No.: 11/287,434

(22) Filed: Nov. 28, 2005

(65) Prior Publication Data

US 2006/0119773 A1 Jun. 8, 2006

(30) Foreign Application Priority Data

Dec. 7, 2004 (JP) ................................. 2004-354708

(51) Int. Cl.
*G02F 1/1335* (2006.01)
(52) U.S. Cl. ...................... 349/114; 349/117; 349/120
(58) Field of Classification Search .................. 349/114, 349/117–121
See application file for complete search history.

(56) References Cited

U.S. PATENT DOCUMENTS

| | | | | |
|---|---|---|---|---|
| 6,611,306 B2 * | 8/2003 | Baek | ............................. | 349/117 |
| 6,704,081 B2 * | 3/2004 | Ha et al. | ........................ | 349/114 |
| 7,239,362 B2 | 7/2007 | Tsuchiya | | |
| 7,248,311 B2 | 7/2007 | Tsuchiya | | |
| 2004/0119920 A1 * | 6/2004 | Uesaka et al. | ................. | 349/114 |
| 2005/0018118 A1 * | 1/2005 | Kubo et al. | .................... | 349/119 |

FOREIGN PATENT DOCUMENTS

| | | |
|---|---|---|
| JP | 2000-35570 | 2/2000 |
| JP | 2000-187220 | 7/2000 |
| JP | 2001-221995 | 8/2001 |
| JP | 2002-311426 | 10/2002 |
| JP | 2004-157454 | 6/2004 |
| KR | 2004-019288 | 3/2004 |

OTHER PUBLICATIONS

Machine translation of JP 2000-35570.*
Korean Office Action dated Dec. 13, 2006 with partial English-language translation.
Japanese Office Action dated Oct. 1, 2008 with Partial English-Language Translation.

* cited by examiner

*Primary Examiner* — Brian M. Healy
*Assistant Examiner* — Mary A El-Shammaa
(74) *Attorney, Agent, or Firm* — McGinn IP Law, PLLC

(57) ABSTRACT

A transflective liquid crystal display device includes a liquid crystal film and a polarizing plate on a backlight source side. A transflective liquid crystal display device includes an uniaxially anisotropic film (a quarter wave plate) and a polarizing plate on a visual confirmation side. The liquid crystal film has the nematic hybrid orientation, in which a polymeric liquid crystal substance formed in a liquid state is fixed. The optical axis of the anisotropic film is disposed to be orthogonal or substantially orthogonal to that of the liquid crystal film.

14 Claims, 13 Drawing Sheets

Optical axis arrangement A of optical elements at an opposite substrate side

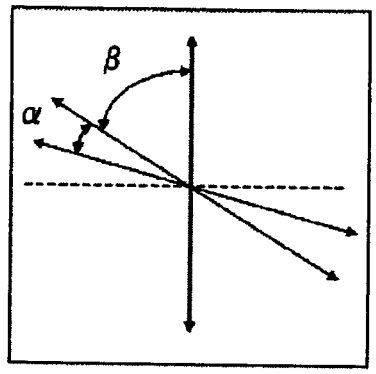

Optical axis arrangement B of optical elements at an opposite substrate side

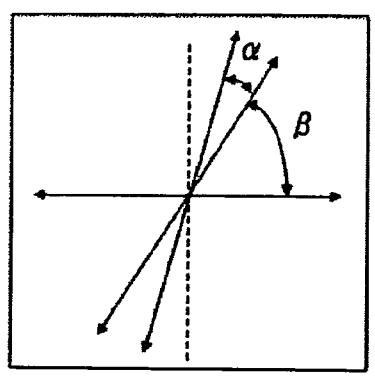

Eq. 1: $42° \leq \beta - \alpha \leq 48°$
Eq. 2: Angle of a lagging axis for a second phase contrast film $= 90°$ Eq. 3: $42° \leq \beta - \alpha \leq 48°$
Eq. 4: Angle of a lagging axis for a second phase contrast film $= 0°$

⇩

Optical-axis arrangement A1

$0° < \alpha \leq 45°$

Optical-axis arrangement A2

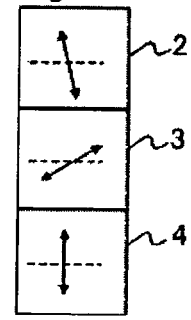

$45° < \alpha < 90°$

⇩

Optical-axis arrangement B1

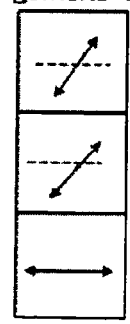

$0° < \alpha \leq 45°$

Optical-axis arrangement B2

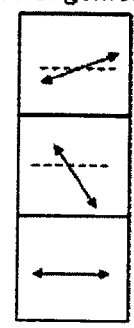

$45° < \alpha < 90°$

Optical axis arrangement C of optical elements at an active matrix substrate side
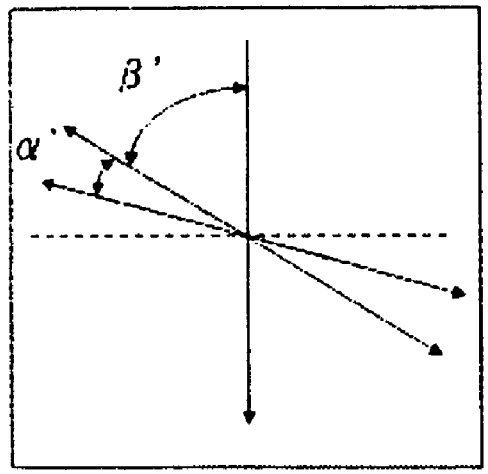
Eq. 5: $42 \leq \beta' - \alpha' \leq 48°$
Eq. 6: Tilted direction of a liquid crystal film
$= -90°$
Optical-axis arrangement C1      Optical-axis arrangement C2
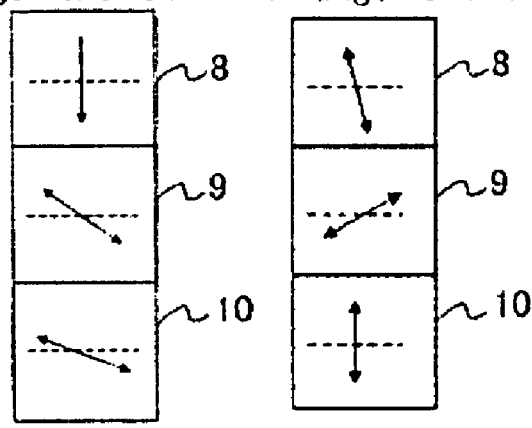
$0° < \alpha' \leq 45°$      $45° < \alpha' < 90°$
FIG.6

TRANSFLECTIVE LIQUID CRYSTAL DISPLAY DEVICE INCLUDING LIQUID CRYSTAL FILM WITH A NEMATIC HYBRID ORIENTATION FORMED ON A SUBSTRATE

BACKGROUND OF THE INVENTION

1. Field of the Invention

The present invention relates to a transflective liquid crystal display device provided with transmission and reflection regions in a pixel, and particularly relates to an arrangement configuration of optical members in the transflective liquid crystal display device.

2. Description of the Prior Art

Utilization is advanced in a wide range of fields, such as OA equipment and a portable device, from the feature of small size, a thin shape, and low power consumption in a liquid crystal display. Unlike a cathode ray tube (CRT) or an electroluminescence (EL) display device, the liquid crystal display device does not have a function which emits light itself. Therefore, a backlight source is used for the transmissive liquid crystal display device. The transmissive liquid crystal display device controls its display by switching the transmission/interception of the backlight by use of a liquid crystal panel. The transmissive liquid crystal display device can obtain a bright screen independently of the surrounding environment due to the backlight. However, the backlight source consumes the power largely. Hence, there is a problem in the transmissive liquid crystal display device that the operating time is short, especially when driving with a battery.

Accordingly, in order to solve the above-mentioned power consumption problem of the backlight source, proposed is a reflective liquid crystal display device which displays by use of a surrounding light. This reflective liquid crystal display device is provided with a reflective plate instead of a backlight source, and controls the display by switching the transmission/interception of the surrounding light by use of the reflective plate in a liquid crystal panel. In the-reflective-liquid-crystal display device, in order to use surrounding light, power consumption can be reduced and a miniaturization and a weight saving can be attained. However, in the-reflective-liquid-crystal display device, when surroundings are dark, there is also a problem to which visibility falls.

Then, in order to prevent the increase in the power consumption by the backlight source, and the fall of the visibility by surrounding environment, a transflective-liquid-crystal display device is proposed. The transflective liquid crystal display device is provided with transmission and reflection regions in each pixel, which leads to functioning as both the transflective and reflective liquid crystal display devices. This transmissive liquid crystal display device is provided with an uneven resin layer in a region to be the reflection region on an active matrix substrate. Subsequently, on the resin layer, a reflective film made of a metal film or the like is provided, thus forming a reflective plate which reflects a surrounding light diffusely.

The transflective liquid crystal display device requires letting light come into a liquid crystal layer through the transmission region in a transmission mode. For this reason, one or a plurality of optical anisotropic elements and polarizing plates are disposed on a surface opposite to a liquid crystal holding surface of the active matrix substrate (on the back light side). However, there arises a problem with the transflective liquid crystal display device that the light leakage occurs, when viewed from a diagonal direction during black display (the display in a dark state) when a polymeric stretched film is used as the optical anisotropic element.

Japanese Patent Application Laid-Open No. 2002-311426 (Hereinafter, referred to as Patent Literature 1) discloses a method of preventing the occurrence of such light leakage in a transflective liquid crystal display device. A homogeneous-oriented liquid crystal layer is interposed between first and second substrates in the transflective liquid crystal display device disclosed in Patent Literature 1. Furthermore, a first optical element and a first polarizing plate are disposed on a surface opposite to the liquid crystal layer of the first substrate, and a second optical element and a second polarizing plate are disposed on a surface opposite to the liquid crystal layer of the second substrate. Transmission and reflection regions are formed in the second substrate. A backlight is disposed outside a second polarizing plate. The second optical element includes at least one liquid crystal film. The liquid crystal film has a structure of fixing a nematic hybrid orientation formed in a liquid crystal state of a polymeric liquid crystal substance which shows a positive uniaxiality. Note that the term "nematic hybrid orientation" refers to an orientation pattern in which liquid crystal molecules are nematic oriented and, at this point, the angles formed by the directors of liquid crystal molecules and a film plane are different between the upper and lower surfaces of the film. Incidentally, as shown in FIG. 13, a tilt angle is defined as an angle formed by the liquid crystal molecules, which consist of the liquid crystal layer and the liquid crystal film, and the substrate or a film plane direction, and a tilt direction is defined as a direction which makes the formed angle acute.

In the above-mentioned Patent Literature 1, it is possible to compensate for the anisotropy of a phase contrast caused by pretilt in the liquid crystal layer, by using the liquid crystal film for the second optical anisotropic element. As a result, it is possible to reduce the amount of the light leakage in the diagonal direction upon black display.

In the above-mentioned Patent Literature 1, as shown in FIG. 1, the absorption axis of a first polarizing plate 102 is set to be +105°. The lag axes of a first phase contrast plate 103 and a second phase contrast plate 104, both plates being made of two polycarbonate films which are the first optical anisotropic element, are set to be +30° and +90°, respectively. Then, the Patent Literature 1 discloses the configuration in a manner of setting the tilt direction of a liquid crystal film 108 of the second optical anisotropic element to −90°; the lag axis of a polycarbonate film (a third phase contrast plate 109) of the second optical anisotropic element to +150°, and the absorption axis of a second polarizing plate 110 to +165°. Note that a reference symbol 106 in FIG. 1 denotes the liquid crystal layer.

In Patent Literature 1, as shown in FIG. 2B, it is possible to enlarge a region with high contrast ratio (CR) by specifying the optical axis of each optical member as described above compared with a case of using only a polymeric stretched film (a polycarbonate film) as the second optical anisotropic element (FIG. 2A). However, in the configuration of the optical members shown in FIG. 1 of Patent Literature 1, the optical axis of the liquid crystal film 108 is disposed to be parallel to that of the polycarbonate film (the second phase contrast plate 104) of the first optical anisotropic element. Hence, it is not possible to control the coloring which causes a red tinge upon white display when a viewer changes the viewing angle from the front to the left or right.

SUMMARY OF THE INVENTION

The present invention provides a transflective liquid crystal display device with a wide viewing angle, which can control both the light leakage in the diagonal direction upon black display and the coloring upon white display.

A transflective liquid crystal display device of the present invention includes a first substrate and a second substrate opposing to the first substrate, in which transmission and reflection regions are formed. A liquid crystal layer interposed between the two substrates, which is homogeneous oriented. A first optical anisotropic element including an uniaxially anisotropic film and a first polarizing plate are disposed on a surface of the first substrate from the first substrate side, the surface being opposite to the liquid crystal display. A second optical anisotropic element including a liquid crystal film which shows an optically positive uniaxiality and a second polarizing plate, both of which are disposed on a surface of the second substrate from the second substrate side, the surface being opposite to the liquid crystal layer. In the liquid crystal film, a nematic hybrid orientation, in which a polymeric liquid crystal substance formed in a liquid state, is fixed. The optical axis of the anisotropic film is disposed to be orthogonal or substantially orthogonal to that of the liquid crystal film.

The transflective liquid crystal display device of the present invention includes at least a quarter wave plate as the uniaxially anisotropic film of the first optical anisotropic element, and also includes a first half wave plate on the quarter wave plate on an opposite side to the first substrate and a second half wave plate on the liquid crystal film on an opposite side to the second substrate. The orientation direction of liquid crystal molecules consisted of the liquid crystal layer is parallel or substantially parallel to an orientation direction of liquid crystal molecules of the liquid crystal film. In the transflective liquid crystal display device of the present invention, a tilt direction of a liquid crystal on the second substrate side of the liquid crystal layer is the same direction as that of a liquid crystal on the second substrate side of the liquid crystal film.

In the transflective liquid crystal display device of the present invention, when an angle formed by an absorption axis of the first polarizing plate and a lag axis of the first half wave plate is assumed to be α and an angle formed by the lag axis of the first half wave plate and that of the quarter wave plate is assumed to be β, the first polarizing plate, the first half wave plate and the quarter wave plate are disposed to satisfy the following expressions (1) and (2).

$$42° \leq \beta = \alpha \leq 48 \quad (1)$$

$$45° < \alpha < 90° \quad (2)$$

In the transflective liquid crystal display device of the present invention, when an angle formed by an absorption axis of the second polarizing plate and a lag axis of the second half wave plate is assumed to be α' and an angle formed by the lag axis of the second half wave plate and the orientation direction of the liquid crystal molecules of the liquid crystal film is assumed to be β', the second polarizing plate, the second half wave plate and the liquid crystal film are disposed to satisfy the following expressions (3) and (4).

$$42° \leq \beta' - \alpha' \leq 48° \quad (3)$$

$$0° < \alpha' \leq 45° \quad (4)$$

In the transflective liquid crystal display device of the present invention, if, among tilt directions of the liquid crystal layer, a tilt direction in an interface of the first substrate is assumed to be 90° and a counterclockwise direction is assumed to be positive when viewing the transflective liquid crystal display device from a visual confirmation side, the first and second half wave plates and the first and second polarizing plates are disposed to satisfy the following expressions (5) to (8).

$$180° < \text{an angle (°) of the lag axis of the first half wave plate} < 0° \quad (5)$$

$$42° \leq (\text{the angle (°) of the lag axis of the first half wave plate}) \times 2 - (\text{an angle (°) of the absorption axis of the first polarizing plate}) \leq 48° \quad (6)$$

$$90° < \text{an angle (°) of the lag axis of the second half wave plate} < 90° \quad (7)$$

$$132° \leq (\text{the angle (°) of the lag axis of the second half wave plate}) \times 2 - (\text{an angle (°) of the absorption axis of the second polarizing plate}) \leq 138° \quad (8)$$

In the transflective liquid crystal display device of the present invention, the first and second half wave plates and the first and second polarizing plates are disposed to be in mirror-image relations in terms of the orientation direction of the liquid crystal molecules of the liquid crystal layer.

The transflective-liquid-crystal display device of the present invention mentioned above can be applied for a liquid crystal layer having twist angle θ of 0 degree <θ≦30 degrees instead of the liquid crystal layer in a homogeneous alignment. In that case, each optical member can be arranged by the same expressions as formula (1)-(8).

In the transflective liquid crystal display device of the present invention, an optical anisotropic element including a liquid crystal film is disposed on a surface opposite to a liquid crystal holding surface of the second substrate provided with reflection and transmission regions. Furthermore, the liquid crystal film and a uniaxial anisotropic film (a quarter wave plate) included in the optical anisotropic element disposed on a surface opposite to a liquid crystal holding surface of the first substrate are disposed in a manner of being substantially orthogonal to the optical axis of each other. Moreover, the optical axes of the other optical members are set based on a predetermined relational expression, relative to the arrangement of the optical axes of the liquid crystal film and the uniaxial anisotropic film. Accordingly, it is possible for the transflective liquid crystal display device of the present invention to control the light leakage in the diagonal direction upon black display while compensating for the anisotropy of a phase contrast caused by the pretilt. In addition, it is possible for the transflective liquid crystal display device of the present invention to control the coloring upon white display by controlling a discrepancy in diffusion at each wavelength.

In this manner, according to the present invention, it is possible to realize a transflective liquid crystal display device with a wide viewing angle while controlling both of the light leakage in the diagonal direction upon black display and the coloring upon white display.

BRIEF DESCRIPTION OF THE DRAWINGS

The above and other objects, features and advantages of the present invention will become more apparent from the following detailed description when taken in conjunction with the accompanying drawings wherein:

FIGS. 5A and 5B are views showing the combinations of the axis arrangements of the optical members disposed on an opposite substrate side in the transflective liquid crystal display device according to the first embodiment of the present invention;

FIG. 6 is a view showing the combination of the axis arrangements of the optical members disposed on an active matrix substrate side in the transflective liquid crystal display device according to the first embodiment of the present invention;

DETAILED DESCRIPTION OF THE PREFERRED EMBODIMENTS

A transflective liquid crystal display device is provided with an optical anisotropic element and a polarizing plate on a backlight source side of a substrate (an active matrix substrate) in which transmission and reflection regions are formed. There arises a problem of light leakage in the diagonal direction upon black display with the transflective liquid crystal display device using a polymeric stretched film as the optical anisotropic element. Accordingly, in the above-mentioned Patent Literature 1, a liquid crystal film is included in a second optical element. This liquid crystal film is designed to have a structure of fixing a nematic hybrid orientation formed in a liquid crystal state of a polymeric liquid crystal substance which shows a positive uniaxiality. Therefore, the anisotropy of a phase contrast caused by pretilt in a liquid crystal layer is compensated, and light leakage in the diagonal direction upon black display is controlled.

Figure 1:
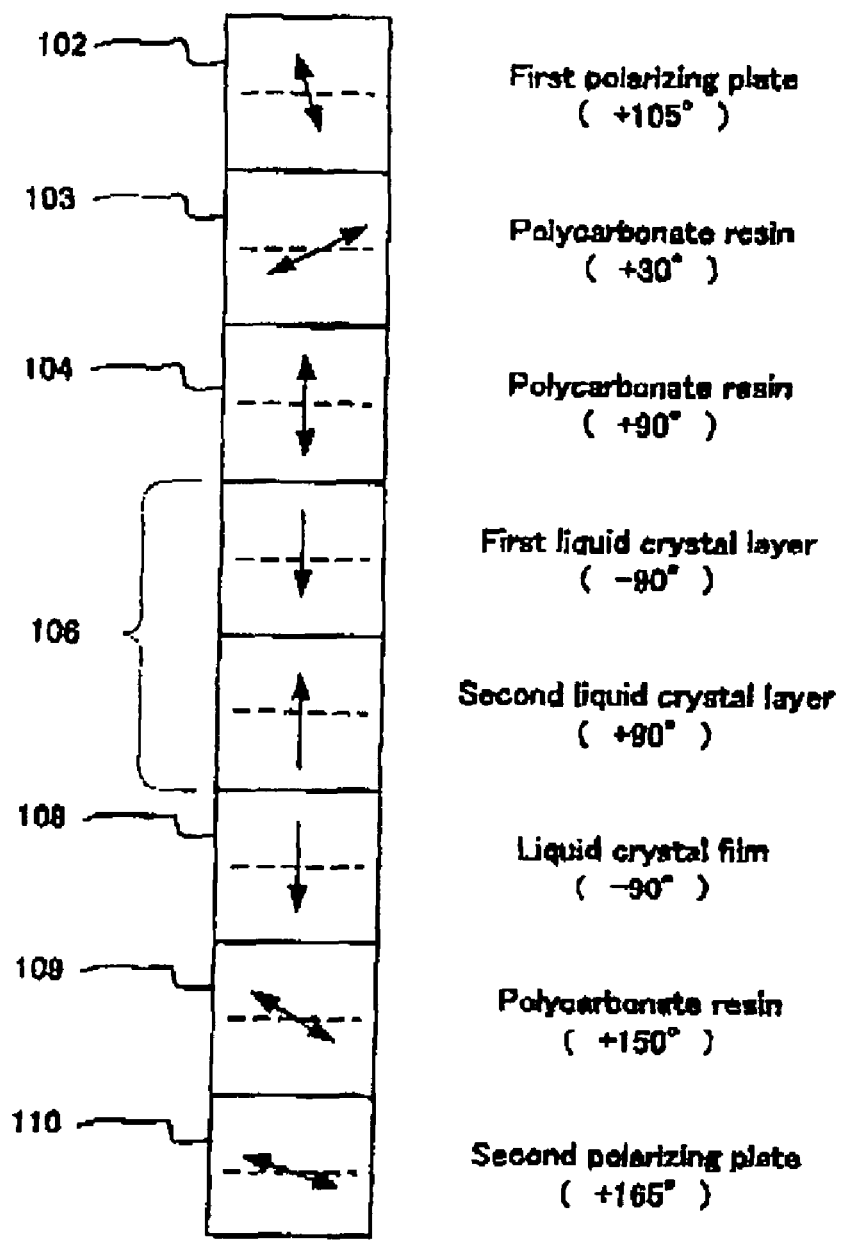
FIG. 1 is a view schematically showing the configuration of optical members of a conventional transflective liquid crystal display device.
Figure 2A:
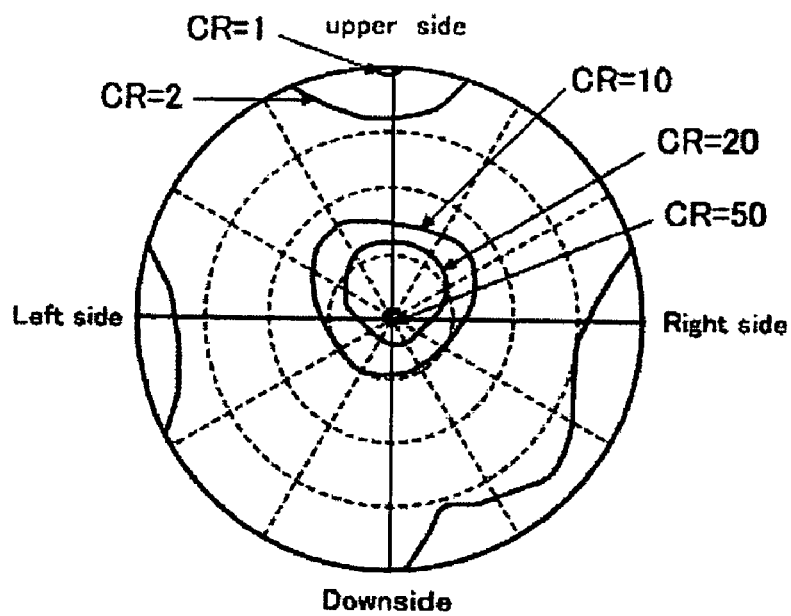
FIGS. 2A and 2B are views showing an improvement effect of the features of the viewing angle in the conventional transflective liquid crystal display device.
Figure 2B:
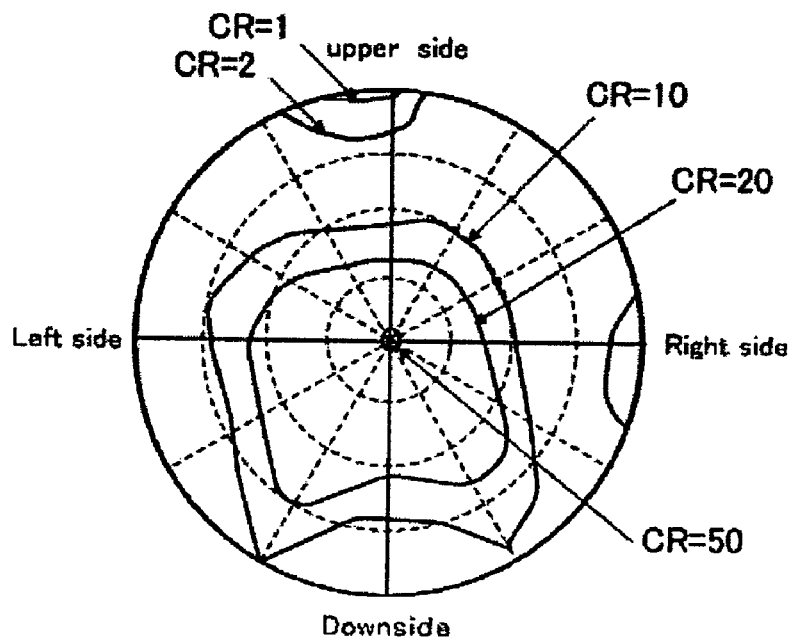

Nevertheless, as shown in FIG. 1, the optical axes of a liquid crystal film and a polycarbonate film of a first optical anisotropic element are disposed to be parallel to each other in the transflective liquid crystal display device disclosed in Patent Literature 1. Consequently, there occurs the coloring which causes a red tinge upon white display when a viewer changes the viewing angle from the front to the left or right in the transflective liquid crystal display device disclosed in Patent Literature 1.

With the present invention, it is possible to realize a transflective liquid crystal display device which solves the foregoing problems for the first time by specifying the optical axis of each optical member of the transflective liquid crystal display device. Note that the term "optical axis of an optical member" refers to the absorption axis of a polarizing plate, the lag axis of a phase contrast plate, the pretilt directions of a pair of substrates, the tilt direction of a liquid crystal film, and the like.

In the transflective liquid crystal display device of the present invention, the combination of the axis arrangements of the other optical members is determined based on a predetermined relational expression, relative to the tilt direction of the liquid crystal film.

In the transflective liquid crystal display device of the present invention, changes of color in the left and right and the characteristics of a viewing angle, relative to each axis arrangement, are obtained by simulation in order to make it possible to control not only light leakage upon black display but also the coloring upon white display. Then, in the transflective liquid crystal display device of the present invention, an optimal axis arrangement is specified by comparing and considering the results obtained by the simulation.

A detailed description will hereinafter be given of an embodiment mode of the transflective liquid crystal display device of the present invention, based on embodiments.

First Embodiment

A description will be given of a transflective liquid crystal display device of a first embodiment of the present invention with reference to FIGS. 3 to 11.

Figure 3:
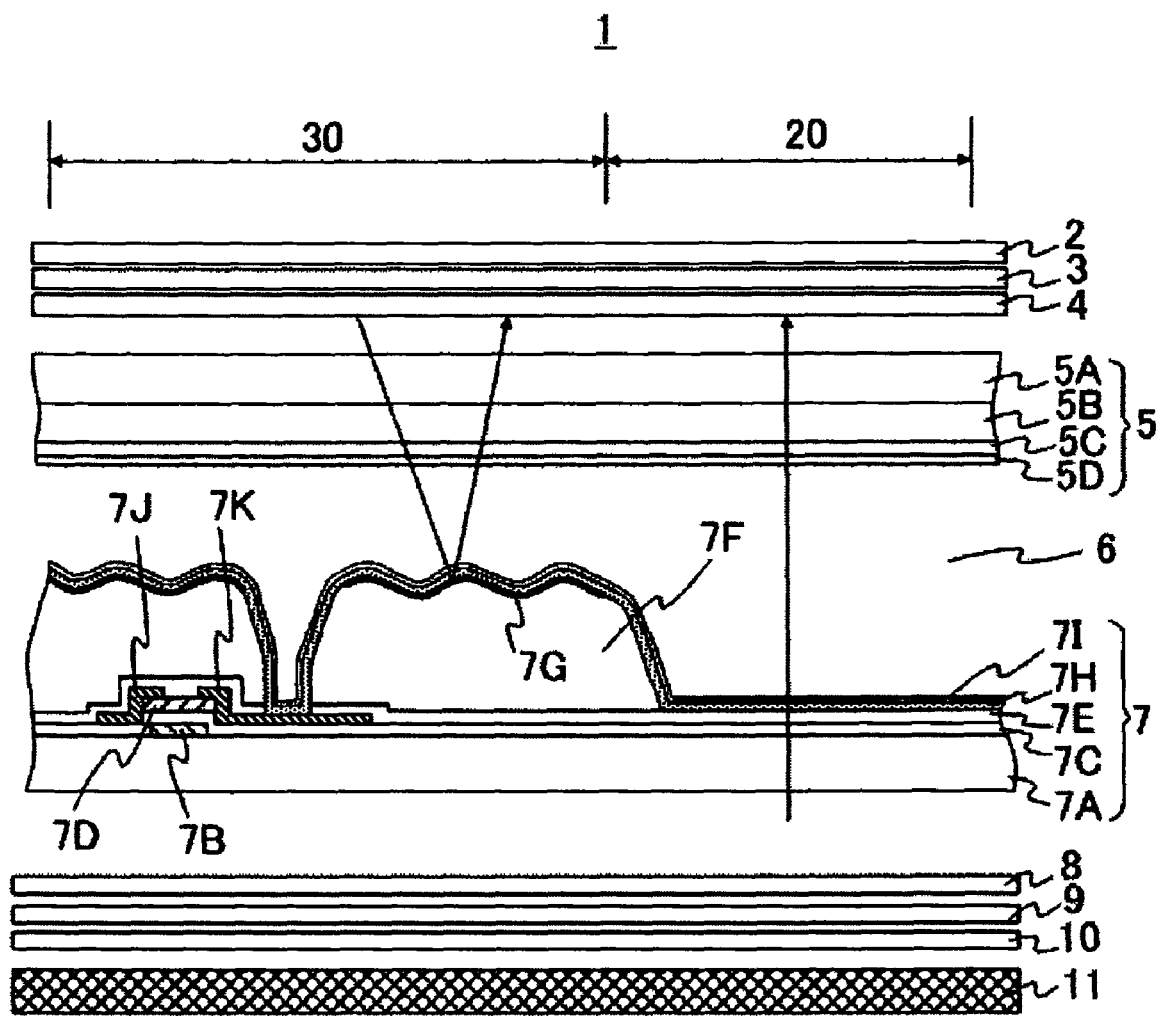
FIG. 3 is a cross-sectional view schematically showing the structure of a transflective liquid crystal display device according to a first embodiment of the present invention.

As shown in FIG. 3, a transflective liquid crystal display device 1 of the embodiment includes a first substrate (hereinafter, referred to as an opposite substrate 5) disposed on a visual confirmation surface side, and a second substrate (hereinafter, referred to as an active matrix substrate 7) provided with a switching element such as a thin film transistor (TFT). A transmission region 20 functioning as a transflective liquid crystal display device, and a reflection region 30 functioning as a reflective liquid crystal display device are formed in the active matrix substrate 7. A liquid crystal layer 6, which is homogeneous oriented, is interposed between both substrates. On the visual confirmation surface side of the opposite substrate 5, a first polarizing plate 2, a first phase contrast plate (a half wave plate) 3 and a second phase contrast plate (a quarter wave plate) 4 are disposed. On a backlight source 11 side of the active matrix substrate 7, a liquid crystal film 8, a third phase contrast plate (a half wave plate) 9 and a second polarizing plate 10 are disposed.

The active matrix substrate 7 is provided with a transparent insulating substrate 7A such as a glass substrate, and a gate line and gate electrode 7B, a gate insulating film 7C, a semiconductor layer 7D, a data line and source electrode 7J, and a drain electrode 7K, which are sequentially formed on the transparent insulating substrate 7A. The active matrix substrate 7 is further provided with a passivation film 7E which covers the semiconductor layer 7D, the data line and the source electrode 7J and the drain electrode 7K. An uneven film 7F, in which the thickness of the liquid crystal layer 6 in the reflection region and the thickness of the liquid crystal layer 6 in the transmission region are controlled to be approximately equivalent to a quarter wavelength and a half wavelength respectively, is formed on the passivation film 7E. This uneven film 7F may be formed only in the reflection region, or may be formed by changing the thicknesses in the reflection and transmission regions. Then, a reflective film 7G made of a metal material such as aluminum (Al) or aluminum (Al) alloy is provided on the uneven film 7F. Further, a transparent electrode film 7H made of indium tin oxide (ITO) film and the like is provided all over a pixel.

The opposite substrate 5 is provided with a transparent insulating substrate 5A such as a glass substrate and a color filter 5B formed thereon. An opposite substrate 5C made of ITO film and the like is formed on the color filter 5B. Additionally, orientation films 5D and 7I are provided on the opposite surface sides of both substrates to give pretilt to the liquid crystal layer 6. A desired gap is formed by bonding both substrates with a spacer interposed therebetween, thus forming the liquid crystal layer 6 by injecting liquid crystals into the gap.

Figure 4:
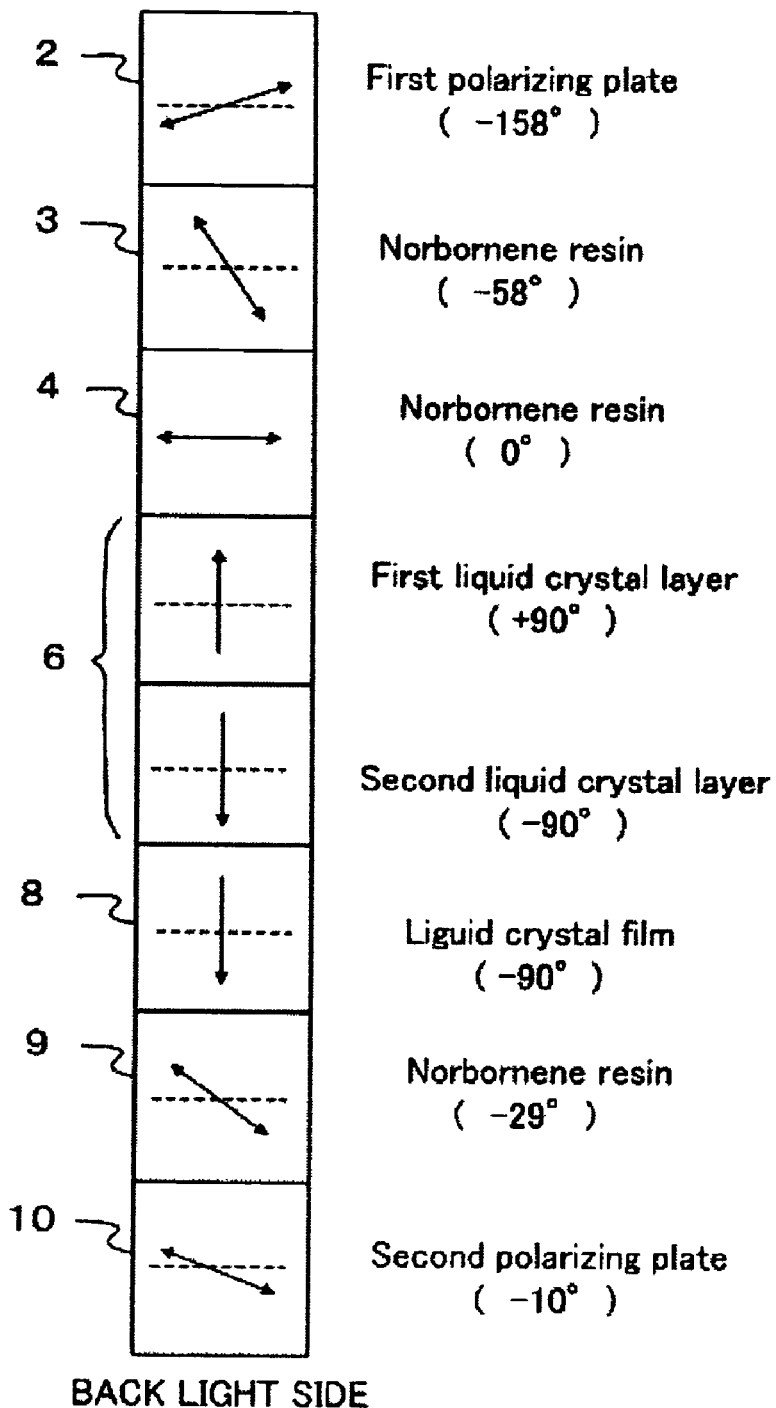
FIG. 4 is a view schematically showing the configuration of optical members of the transflective liquid crystal display device according to the first embodiment of the present invention.

FIG. 4 is a view of extracting only the optical members of the transflective liquid crystal display device 1 with the foregoing configuration. On the opposite substrate side, provided are the first polarizing plate 2, the first phase contrast plate (the half wave plate) 3, and the second phase contrast plate (the quarter wave plate) 4 sequentially from the visual confirmation surface side. On the active matrix substrate 7 side, provided are the liquid crystal film 8, the third phase contrast plate (the half wave plate) 9, and the second polarizing plate 10 sequentially from the liquid crystal layer side. Then, a first liquid crystal layer is provided in the vicinity of the opposite substrate 5, and a second liquid crystal layer is provided in the vicinity of the active matrix substrate 7.

Note that although two optical anisotropic elements are provided respectively on the opposite substrate 5 and active matrix substrate 7 sides in FIG. 3, it is sufficient if there is at least the quarter wave plate on the opposite substrate 5 side and if there is at least the liquid crystal film 8 on the active matrix substrate 7 side.

The structures, materials and the like of the first polarizing plate 2 and second polarizing plate 10 are not particularly limited. For the polarizing plate, a material such as a polarizing film made of, for example, polyvinyl alcohol (PVA) in which a dichroic substance including iodine is oriented in one direction can be used. This polarizing film may be used solely, or a protective film may be provided on one side or both sides of the polarizing film.

In addition, the structures, materials and the like of the first phase contrast plate 3, the second phase contrast plate 4 and the third phase contrast plate 9 are not particularly limited, too. It is possible for these phase contrast plates to use a material such as uniaxial polymeric stretched film including, for example, norbornene type resin made of Arton or a polycarbonate (PC) resin film. This polymeric stretched film may be used solely, or may be formed on the transparent insulating substrate.

Moreover, the structure, materials and the like of the liquid crystal film 8 are not particularly limited, too. For the liquid crystal film 8 a material such as, for example, a film obtained by fixing a low polymeric liquid crystal substance, which has been nematic hybrid orientated in a liquid crystal state, due to an optical or thermal crosslinking can be used. Note that the term "nematic hybrid orientation" refers to an orientation pattern in which liquid crystal molecules 6B are nematic oriented, and the angles (tilt angles) formed by the directors of the liquid crystal molecules 6B and the film plane are different in the upper and lower surfaces of the film. Since this liquid crystal film 8 fixes the nematic-oriented liquid crystals, all the directors of the liquid crystal molecules tilt at different angles relative to the film thickness direction. The liquid crystal film 8 does not have an optical axis when viewed as a structural body. However, assuming that a direction of projecting in the plane direction of the active matrix substrate 7 relative to the orientation direction of the liquid crystal molecules of the liquid crystal film 8 is specified as the orientation direction of the liquid crystal molecules, it is possible to approximately handle the liquid crystal film 8 as a positive uniaxial phase contrast plate only when viewed from the vertical direction of the plane direction of the active matrix substrate 7. Note that, in FIG. 7, a reference numeral 5 denotes the opposite substrate, and a reference numeral 6A denotes the liquid crystal molecules of the liquid crystal layer 6.

Hereinafter, a description will be given of the procedures of determining the arrangement of the optical axes of the optical members on the opposite substrate 5 side and on the active matrix substrate 7 side.

(Tilt Direction of Liquid Crystal Film 8)

Figure 7:
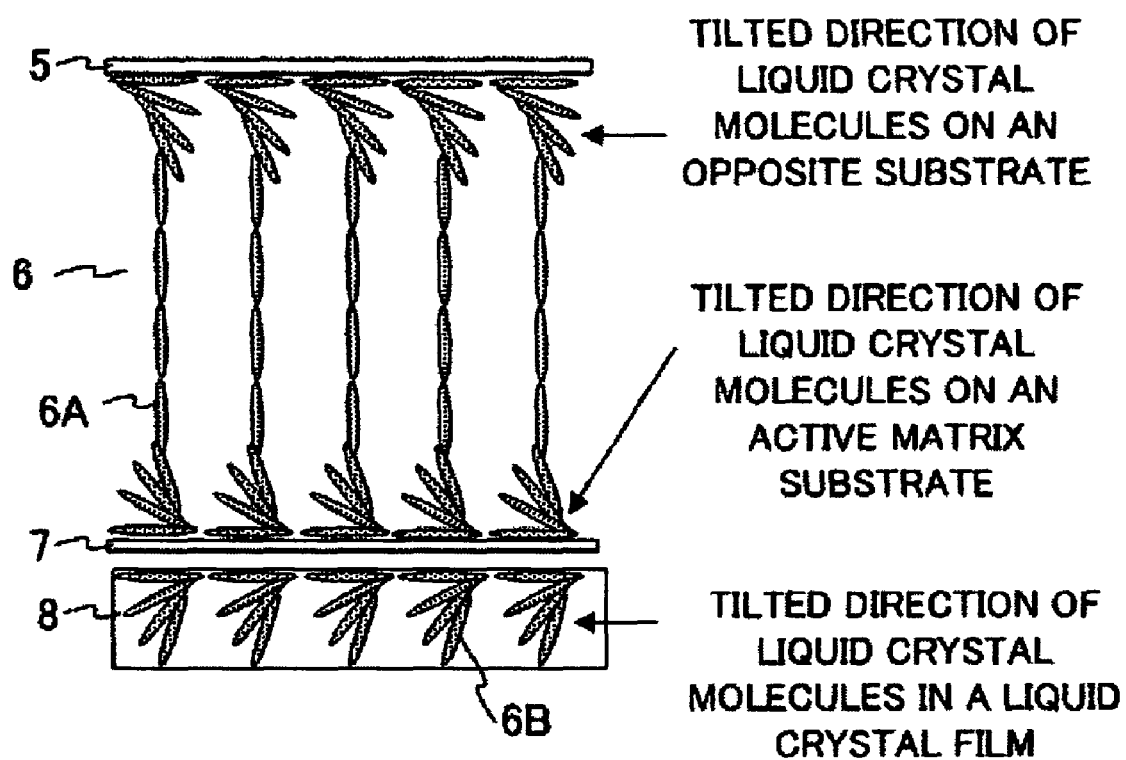
FIG. 7 is a view schematically showing the structure of a liquid crystal film used in the transflective liquid crystal display device according to the first embodiment of the present invention.

The transflective liquid crystal display device 1 of the embodiment is configured to be a bright state in an initial state and to change to a dark state by applying voltage. However, the pretilt is given to cause the directors of the liquid crystal molecules of the liquid crystal layer 6 to be uniquely determined, when turning on/off the voltage. Here, there is a problem that the viewing angle becomes narrow when applying the voltage, since the anisotropy occurs in the viewing angle direction in the director whose liquid crystal molecules are not completely standing up especially in a black state. Yet, it is possible to compensate for the pretilt by giving the tilt to the liquid crystal film 8 as shown in FIG. 7. Furthermore, liquid crystal displays are often driven at a voltage of 3 to 6 volts to reduce the power consumption. Accordingly, it is not possible to completely eliminate the phase contrast of the liquid crystal layer 6 since the directors of the liquid crystal molecules do not become uniform when the voltage is low. As a result, there is a problem that remaining retardation occurs and that a black brightness does not fall sufficiently. However, it is possible to compensate for the problem by adding or subtracting the phase contrast equivalent to the remaining retardation to or from the phase contrast of the quarter wave plate. The lag axis of the quarter wave plate is required to be disposed in substantially parallel to or at substantially right angle relative to the orientation direction of the liquid crystal molecules of the liquid crystal layer 6 with the arrangement of when performing the compensation. Therefore, the phase contrast of the liquid crystal film 8 is required to be equivalent to the quarter wave plate in order to simultaneously achieve the compensation for the foregoing pretilt and the compensation for the remaining retardation. Moreover, the orientation direction of the liquid crystal molecules of the liquid crystal film 8 is required to be substantially parallel to that of the liquid crystal molecules of the liquid crystal layer 6. Additionally, the direction of the tilt angle of the liquid crystal molecules on the active matrix substrate 7 side of the liquid crystal layer 6 is required to be the same as the tilt direction of the liquid crystal molecules on the second substrate side of the liquid crystal film 8. In other words, when the tilt direction of the liquid crystal molecules of the active matrix substrate 7 of the liquid crystal layer 6 is −90°, the tilt direction of the liquid crystal molecules on the active matrix substrate 7 side of the liquid crystal film 8 is required to be −90°.

(Absorption Axis of First Polarizing Plate 2, Lag Axes of First and Second Phase contrast Plates 3 and 4)

Next, the optical axes of the optical members disposed on the visual confirmation surface side of the opposite substrate 5 are determined relative to the liquid crystal film 8 whose tilt direction is set to be approximately −90°. FIGS. 5A and 5B shows the arrangement method of the optical axes of the relevant optical members. FIG. 5A shows a case where the lag axis of the second phase contrast plate (the quarter wave plate) 4 is disposed to be substantially parallel to the orientation direction of the liquid crystal molecules of the liquid crystal layer 6 (referred to as the axis arrangement A). FIG. 5B shows a case where the lag axis of the second phase contrast plate (the quarter wave plate) 4 is disposed to be substantially orthogonal to the orientation direction of the liquid crystal molecules of the liquid crystal layer 6 (referred to as the axis arrangement B).

In the case of the axis arrangement A, the angle formed by the absorption axis of the first polarizing plate 2 and the lag axis of the first phase contrast plate 3 is assumed to be α. The angle formed by the lag axes of the first phase contrast plate 3 and the second phase contrast plate 4 is assumed to be β. Then, the optical axis of each optical member has relations of expressions 1 and 2.

$$42° \leq \beta - \leq 48°$$ Expression 1:

(the angle of the lag axis of the second phase contrast plate 4=90°) Expression 2:

As combinations to satisfy these relational expressions, the following two axis arrangements are specified as shown in the lower part of FIG. 5A: an axis arrangement A1 in a case of $0° < \alpha \leq 45°$, and an axis arrangement A2 in a case of $45° < \alpha < 90°$.

Similarly, in the case of the axis arrangement B, the angle formed by the absorption axis of the first polarizing plate 2 and the lag axis of the first phase contrast plate 3 is assumed to be α, and the angle formed by the lag axis of the first phase contrast plate 3 and that of the second phase contrast plate 4 is assumed to be β. Then, the optical axis of each optical member has relations of expressions 3 and 4.

$$42° \leq \beta - \alpha \leq 48°$$ Expression 3:

(the angle of the lag axis of the second phase contrast plate 4=0°) Expression 4:

As combinations to satisfy these relational expressions, the two axis arrangements are specified as shown in the lower part of FIG. 5B: an axis arrangement B1 in a case of $0° < \alpha \leq 45°$, and an axis arrangement B2 in a case of $45° < \alpha < 90°$.

(Absorption Axis of Second Polarizing Plate 10 and Lag axis of Third Phase Contrast Plate 9)

On the other hand, the optical axes of the third phase contrast plate 9 and the second polarizing plate 10 is determined relative to the liquid crystal film 8 whose tilt direction is set to be substantially −90°. As shown in FIG. 6, the angle formed by the absorption axis of the second polarizing plate 10 and the lag axis of the third phase contrast plate 9 is assumed to be α'. The angle formed by the lag axis of the third phase contrast plate 9 and the tilt direction of the liquid crystal film 8 is assumed to be β'. Then, the optical axis of each optical member has relations of expressions 5 and 6.

$$42° \leq \beta' - \alpha' \leq 48°$$ Expression 5:

(the tilt direction of the liquid crystal film 8)=−90° Expression 6:

As combinations to satisfy these relational expressions, an axis arrangement C1 can be considered in a case of $0° < \alpha' \leq 45°$, and an axis arrangement C2 can be considered in a case of $45° < \alpha' \leq 90°$. In other words, two axis arrangements are specified for the tilt direction of the liquid crystal film 8 (referred to as the axis arrangement C).

Hence, when the orientation direction of the liquid crystal molecules of the liquid crystal layer 6 is determined, two types of axis arrangements of the second phase contrast plate 4 are specified relative to the orientation direction of the liquid crystal molecules of the liquid crystal layer 6. Then, for each, two types of axis arrangements of the first phase contrast plate 3 and the first polarizing plate 2 are specified. On the other hand, two types of axis arrangements of the third phase contrast plate 9 and the second polarizing plate 10 are specified relative to the axis arrangement of the liquid crystal film 8. Accordingly, 2×2×2=8 types can be considered as the axis arrangements of the other optical members relative to the axis arrangement of the liquid crystal film 8.

In addition, when viewed from the visual confirmation side, a counterclockwise direction is set to be a positive direction when the orientation direction of the liquid crystal molecules of the homogeneous-oriented liquid crystal layer 6 is set to be 90°. Among the tilt directions of the liquid crystal molecules of the liquid crystal layer 6, the tilt directions on the first substrate (the opposite substrate 5) side is set to be 90° and the second substrate (the active matrix substrate 7) side are set to be −90°, respectively. In this case, the tilt direction of the liquid crystal molecules on the second substrate side of the liquid crystal film 8 is limited to −90°. At this point, when the quarter wave plate is disposed to set the angle of its lag axis at 0°, the arrangement is limited to one which satisfies expressions 7 to 10, or one in which all arrangements are in mirror-image relations.

$$-180° < \text{the angle (°) of the lag axis of the first phase contrast plate (the half wave plate)} < 0°$$ Expression 7:

$$42° \leq (\text{the angle (°) of the lag axis of the first phase contrast plate (the half wave plate)}) \times 2 - (\text{the angle (°) of the absorption axis of the first polarizing plate}) \leq 48°$$ Expression 8:

$$90° < \text{the angle (°) of the lag axis of the third phase contrast plate (the half wave plate)} < 90°$$ Expression 9:

$$132° \leq (\text{the angle (°) of the lag axis of the third phase contrast plate (the half wave plate)}) \times 2 - (\text{the angle (°) of the absorption axis of the second polarizing plate}) \leq 138°$$ Expression 10:

Further, when the second phase contrast plate (the quarter wave plate) is disposed to set the angle of its lag axis at 90°, the arrangement is limited to one which satisfies expressions 1 to 14, or one in which all arrangements are in mirror-image relations.

$$90° < (\text{the angle (°) of the lag axis of the first half wave plate}) < 270°$$ Expression 11:

$$132° \leq (\text{the angle (°) of the lag axis of the first half wave plate}) \times 2 - (\text{the angle (°) of the absorption axis of the first polarizing plate}) \leq 138°$$ Expression 12:

$$90° \leq (\text{the angle (°) of the lag axis of the second half wave plate}) \leq 270°$$ Expression 13:

$$132° \leq (\text{the angle (°) of the lag axis of the second half wave plate}) \times 2 - (\text{the angle (°) of the absorption axis of the second polarizing plate}) \leq 138°$$ Expression 14:

Here, since only controlling the light leakage in the diagonal direction upon black display is considered in Patent Literature 1, the tilt direction of the liquid crystal film 8 is set to be parallel to the lag axis of the second phase contrast plate (the quarter wave plate) 4. The present invention obtains changes of color in the left and right and the characteristics of the viewing angle for the respective foregoing eight types of axis arrangements by simulation in order to determine an optimal axis arrangement in consideration of controlling both of the light leakage in the diagonal direction upon black display and the coloring upon white display. The results are shown in FIGS. 8 to 11.

Figure 8:
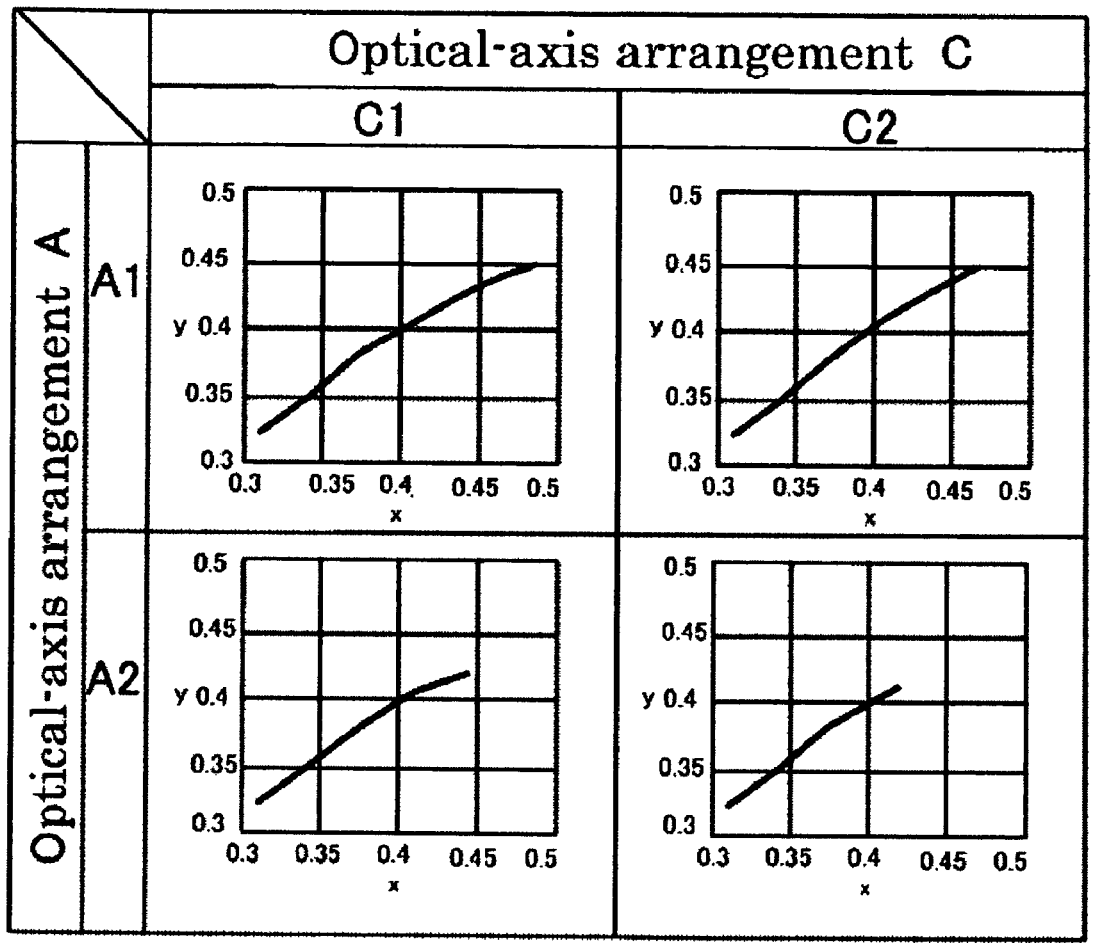
FIG. 8 is a chromaticity diagram showing changes of color in the left and right in a case of an axis arrangement (A) of the transflective liquid crystal display device according to the first embodiment of the present invention.
Figure 9:
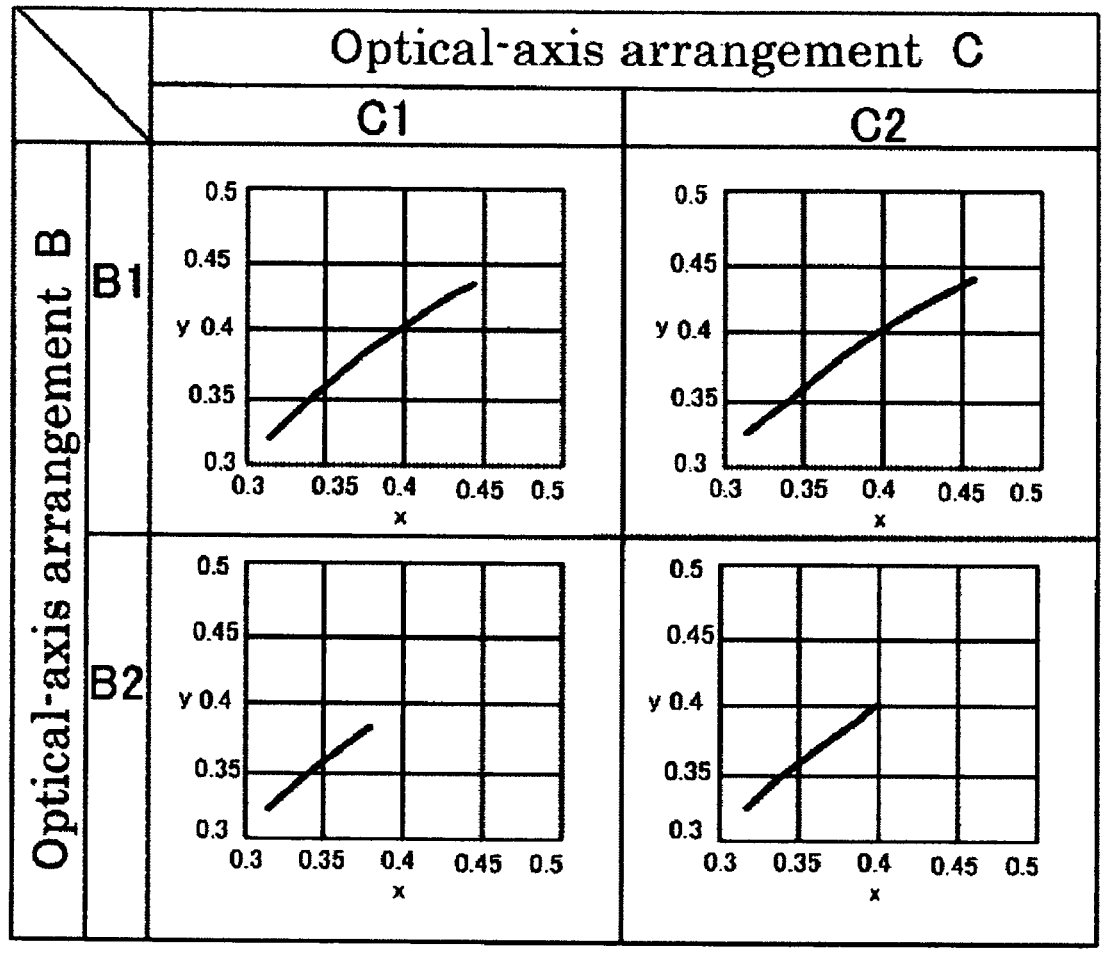
FIG. 9 is a view showing changes of color in the left and right in a case of an axis arrangement (B) of the transflective liquid crystal display device according to the first embodiment of the present invention.

FIG. 8 is a chromaticity diagram showing changes of color in four types of axis arrangements pertaining to the axis arrangement A among the foregoing eight types of axis arrangements. FIG. 9 is a chromaticity diagram showing changes of color in the four types of axis arrangements pertaining to the axis arrangement B among the foregoing eight types of axis arrangements. The x and y axes of each diagram indicate the chromaticity coordinates of CIE1931. Additionally, the lines in the diagrams show the plotted colors when the viewing angle is deviated. The bottom left shows the color when viewed from the front. The diagrams show that the more going up to the right, the stronger the coloring becomes.

Comparing the changes of color in the eight types of axis arrangements in FIGS. 8 and 9, the axis arrangements A-A1 (the upper part in FIG. 8) has the strongest coloring. Hereinafter, it can be seen that the coloring is controlled gradually in the order of: the axis arrangements B-B1 (the upper part in FIG. 9); the axis arrangements A-A2 (the lower part in FIG. 8); the axis arrangement B-B2-C2 (the right lower part in FIG. 9); and the axis arrangement B-B2-C1 (the left lower part in FIG. 9). From this result, it is found out that the axis arrangement B-B1-C1 is the most excellent in terms of the control of the coloring.

Figure 10:
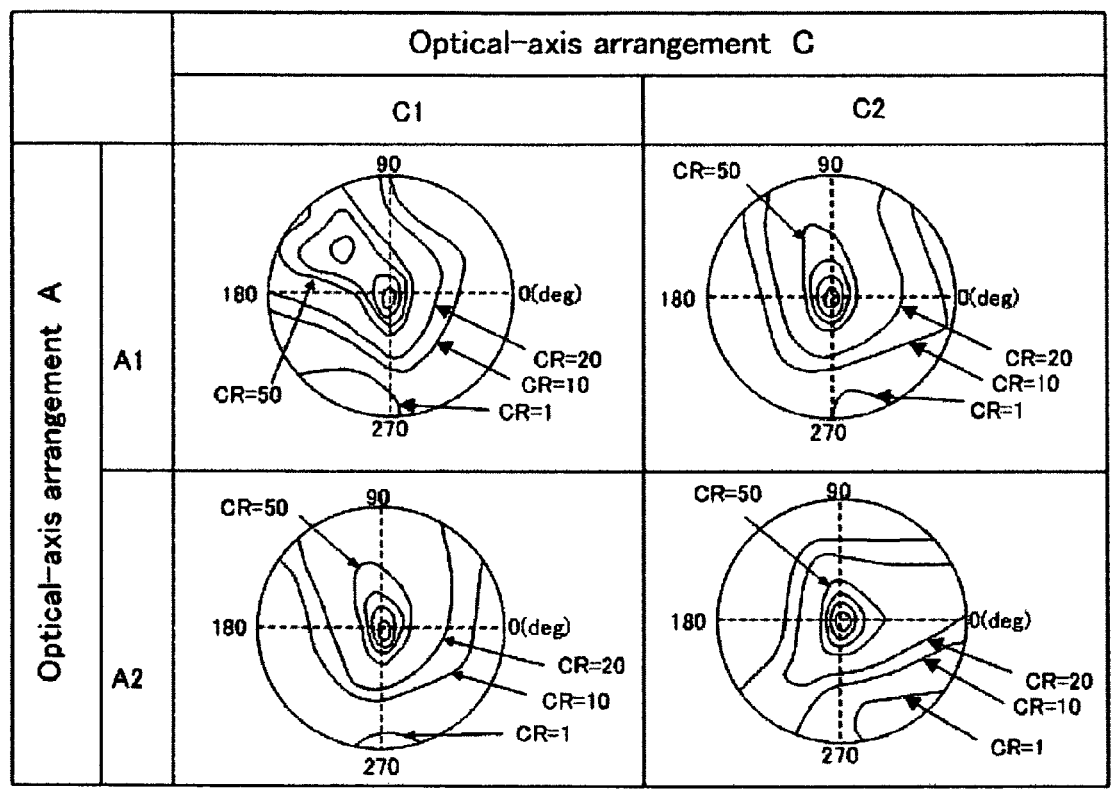
FIG. 10 is a view showing the characteristics of a viewing angle in a case of the axis arrangement (A) of the transflective liquid crystal display device according to the first embodiment of the present invention.
Figure 11:
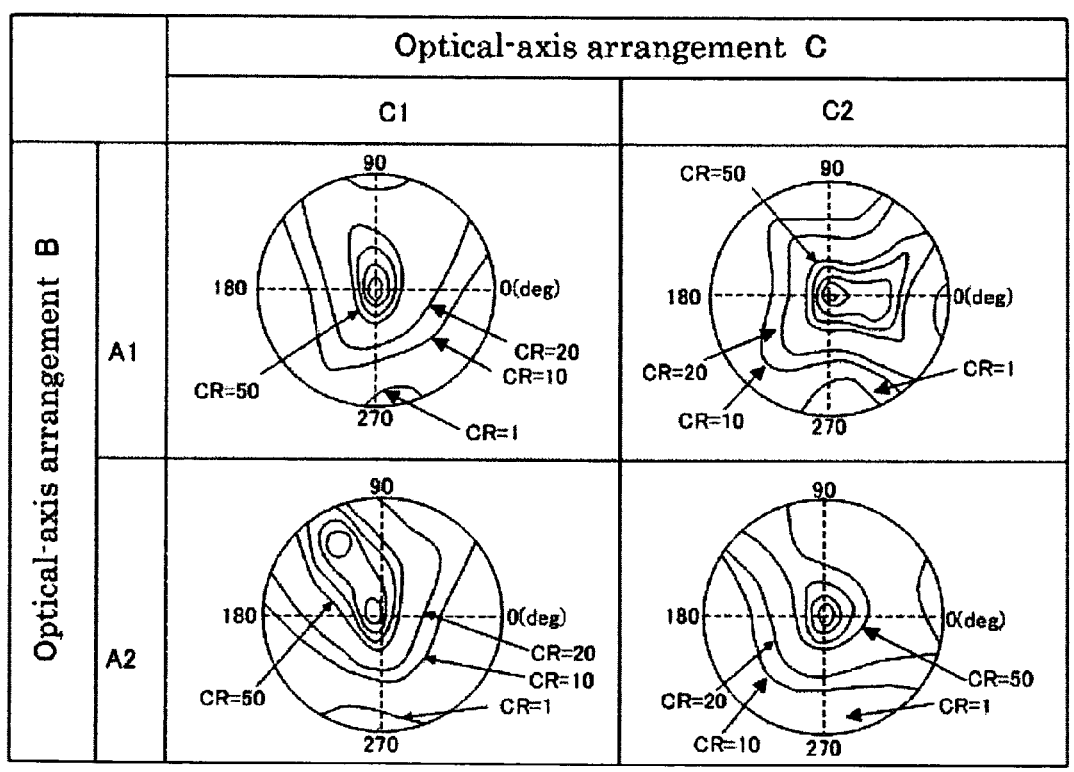
FIG. 11 is a view showing the characteristics of the viewing angle in a case of the axis arrangement (B) of the transflective liquid crystal display device according to the first embodiment of the present invention.

Moreover, FIG. 10 is a view showing the characteristics of the viewing angles in the four types of axis arrangements pertaining to the axis arrangement A among the foregoing eight types of axis arrangements. FIG. 11 is a view showing the characteristics of the viewing angles in the four types of axis arrangements pertaining to the axis arrangement B among the foregoing eight types of axis arrangements. The circumference direction of each diagram indicates an azimuth (0° to 360°), and the radial direction indicates a polar angle (0° to 80°). Furthermore, the lines in the diagrams show the contour lines of the CR (contrast=white brightness/black brightness). The diagrams show that the larger the area in a high contrast region is, the more excellent the characteristics of the viewing angle are.

Comparing the characteristics of the viewing angle of the eight types of axis arrangements in FIGS. 10 and 11, high contrast regions (that is, white regions in FIGS. 10 and 11) are small regarding the following six: the axis arrangement A-A1-C2 (the right upper part in FIG. 10); the axis arrangements A-A2 (the lower part in FIG. 10); the axis arrangements B-B1 (the upper part in FIG. 11) and; the axis arrangement B-B2-C2 (the right lower part in FIG. 11). On the other hand, it is found out that high contrast regions are large regarding the two axis arrangements A-A1-C1 (the left upper part in FIG. 10) and the axis arrangement B-B2-C1 (the left lower part in FIG. 11). From this result, it is found out that a combination of the axis arrangement A-A1-C1 or B-B2-C1 is preferable to make the characteristics of the viewing angle excellent, and that the axis arrangement B-B2-C1 is the most excellent when taking the foregoing control of the coloring into consideration.

From the above-described results, it was proved that the axis arrangements B and B2 are preferable for the optical members disposed on the visual confirmation side of the opposite substrate 5, and the axis arrangement C1 is preferable for the optical members disposed on the backlight side of the active matrix substrate 7. Therefore, in this embodiment, as shown in FIG. 3 for example, the absorption axis of the first polarizing plate 2, the lag axis of the first phase contrast plate 3 and the lag axis of the second phase contrast plate 4 are set to be −158°, −58° and 0°, respectively. In addition, the tilt direction of the liquid crystal film 8, the lag axis of the third phase contrast plate 9 and the absorption axis of the second polarizing plate 10 are set to be −90, −29° and −10', respectively. The optical axis of each optical member is disposed to have the foregoing axis arrangements. Note that in Patent Literature 1, the optical members disposed on the visual confirmation surface side of the opposite substrate 5 uses the axis arrangement A, and that the axis arrangement is essentially different from that of the present invention. It is possible to obtain the effects of the present invention only by setting the optical axis of each optical member in the foregoing axis arrangement B-B2-C1.

In this manner, in the transflective liquid crystal display device of the present invention, the tilt direction of the liquid film 8 disposed on the active matrix substrate 7 side is disposed to be substantially orthogonal to the lag axis of the second phase contrast plate 4 disposed on the opposite substrate 5 side. Moreover, the axis arrangement of the other optical members such as the first polarizing plate 2, the first phase contrast plate 3, the third phase contrast plate 9 and the second polarizing plate 10 is further set relative to the lag axes of the liquid crystal film 8 and the second phase contrast plate 4, based on expressions 1 to 17. Accordingly, it is possible to compensate for the anisotropy of the phase contrast caused by the pretilt, and to control the light leakage in the diagonal direction upon black display. It is also possible to control a deviation in diffusion at each wavelength and also to control the coloring upon white display. Due to these effects, the present invention can realize the transflective liquid crystal display device with a wide viewing angle.

Second Embodiment

Figure 12:
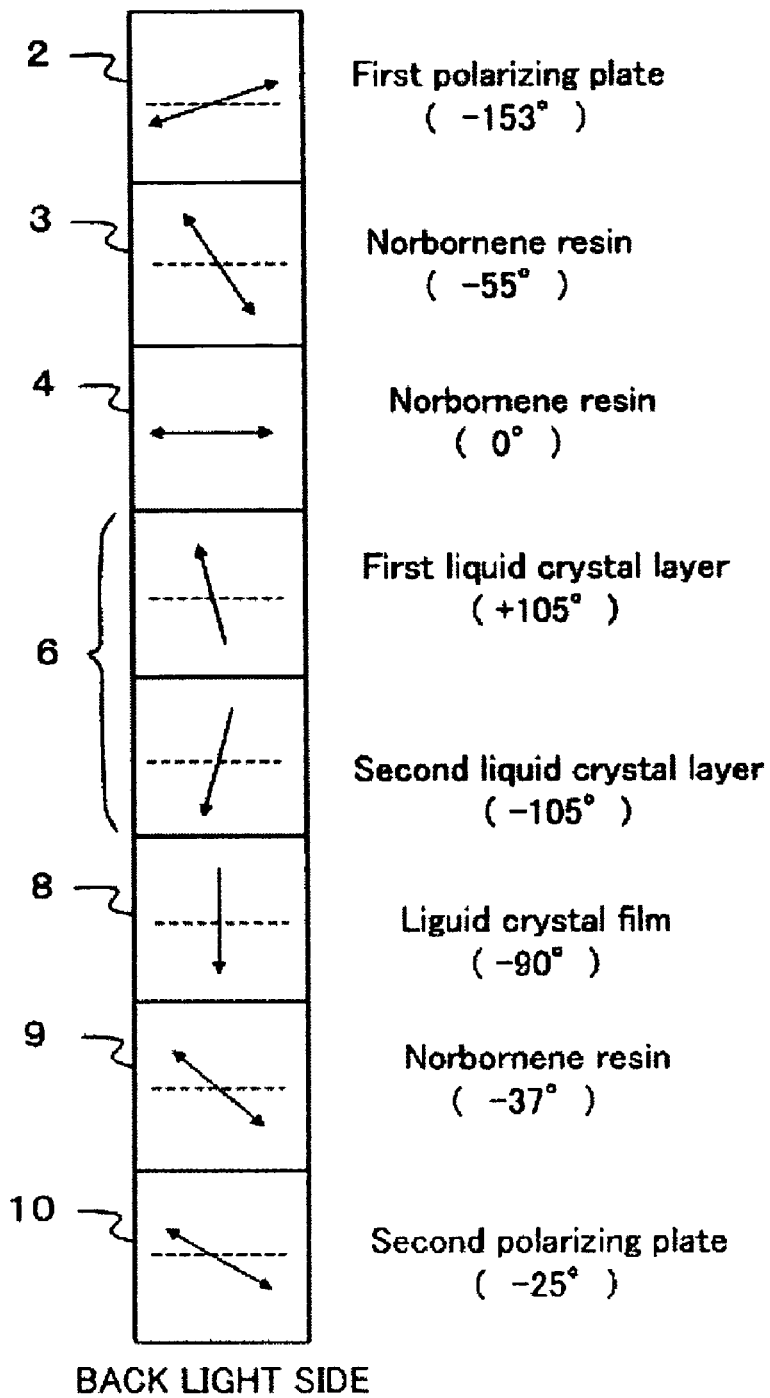
FIG. 12 is a view schematically showing the configuration of optical members of a transflective liquid crystal display device according to a second embodiment of the present invention.
Figure 13:
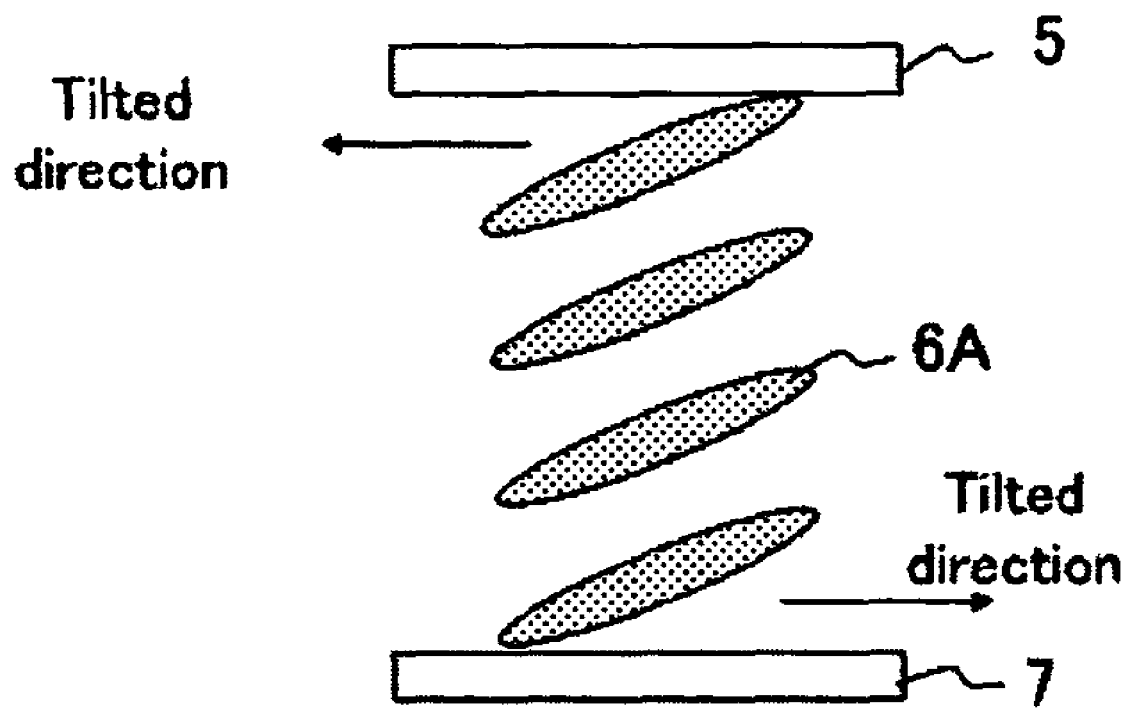
FIG. 13 is a view schematically showing a tilt angle.

Next, a description will be given of a transflective liquid crystal display device according to a second embodiment of the present invention with reference to FIG. 12. FIG. 12 is a cross-sectional view schematically showing the structure of the transflective liquid crystal display device according to the second embodiment. Note that the embodiment shows a case where the configuration of the liquid crystal layer 6 is modified. The configuration of the transflective liquid crystal display device (including an opposite substrate 5, an active matrix substrate 7 and optical members) are the same as that of the first embodiment. Therefore, the descriptions thereof will be omitted.

Although the homogeneous-oriented liquid crystal layer 6 is used in the foregoing first embodiment, the orientation of a liquid crystal layer 6 is in a twisted nematic mode in the embodiment. When the twist angle is assumed to be θ, it is possible to obtain the effects equivalent to those of the first embodiment as long as the twist angle θ is in the foregoing range of 0°<θ<30°. For example, among the orientation directions of the liquid crystal molecules of the liquid crystal layer 6, an orientation direction of the liquid crystal molecules in an interface of a first substrate (the opposite substrate 5) is assumed to be θ1, and an orientation direction of the liquid crystal molecules of an interface of a second substrate (the active matrix substrate 7) is assumed to be θ2. When the angle of a bisector of the orientations θ1 and θ2 of the liquid crystal molecules is set to be 90°, the orientation of the liquid crystal molecules of a liquid crystal film 8 can be arranged at 90°, and the axis arrangement of each optical member can be set based on expressions 1 to 14 as in the first embodiment.

Specifically, the axis arrangement is made as shown in FIG. 12, for example. The absorption axis of a first polarizing plate 2, the lag axis of a first phase contrast plate 3, the lag axis of a second phase contrast plate 4, and the pretilt direction on the opposite substrate 5 side of the liquid crystal layer 6 are to be set at −153°, −55°, 0°, and +105°, respectively. Additionally, the pretilt direction on the active matrix substrate 7 side of the liquid crystal layer 6, the pretilt direction of the liquid crystal film 8, the lag axis of a third phase contrast plate 9, and the absorption axis of a second polarizing plate 10 are to be set at −105°, −90°, −37° and −25°, respectively.

Note that when the orientation of the liquid crystal layer 6 is greater than 30°, the effects of widening the viewing angle is reduced relative to the orientation direction of a liquid crystal film since the deviation in the orientation directions in a liquid crystal layer becomes larger.

While this invention has been described in connection with certain preferred embodiments, it is to be understood that the subject matter encompassed by way of this invention is not to be limited to those specific embodiments. On the contrary, it is intended for the subject matter of the invention to include all alternatives, modifications and equivalents as can be included within the spirit and scope of the following claims.

What is claimed is:

1. A transflective liquid crystal display device, comprising:
   a first substrate;
   a second substrate opposed to the first substrate, in which transmission and reflection regions are formed; and
   a liquid crystal layer interposed between the two substrates, which is homogeneous oriented;
   a first optical anisotropic element, including an uniaxially anisotropic film and a first polarizing plate, is disposed on a surface of the first substrate from a first substrate side, the surface being opposite to the liquid crystal layer;
   a second optical anisotropic element, including a liquid crystal film which shows an optically positive uniaxiality and a second polarizing plate, is disposed on a surface of the second substrate from a second substrate side, the surface being opposite to the liquid crystal layer;
   a first half wave plate disposed on the uniaxially anisotropic film on an opposite side to the first substrate; and
   a second half wave plate disposed on the liquid crystal film on an opposite side to the second substrate,
   wherein a nematic hybrid orientation, in which a polymeric liquid crystal substance formed in a liquid state, of the liquid crystal film is fixed, and the optical axis of the anisotropic film is disposed to be orthogonal or substantially orthogonal to an optical axis of the liquid crystal film,
   wherein an orientation direction of a plurality of liquid crystal molecules in the liquid crystal layer is parallel or substantially parallel to an orientation direction of a plurality of liquid crystal molecules of the liquid crystal film, and
   wherein the first half wave plate and second half wave plate have orientation directions which are other than perpendicular to one another.

2. The transflective liquid crystal display device according to claim 1, wherein at least a quarter wave plate is included as the uniaxially anisotropic film of the first optical anisotropic element.

3. The transflective liquid crystal display device according to claim 1, wherein a tilt direction of a liquid crystal on the second substrate side of the liquid crystal layer is the same direction as a tilt direction of a liquid crystal on the second substrate side of the liquid crystal film.

4. The transflective liquid crystal display device according to claim 1, wherein, if an angle formed by an absorption axis of the first polarizing plate and a lag axis of the first half wave plate is assumed to be β and an angle formed by the lag axis of the first half wave plate and that of the quarter wave plate is assumed to be 13, then the first polarizing plate, the first half wave plate and the quarter wave plate are disposed to satisfy the following expressions (1) and (2):

$$42° \leq \beta - \alpha \leq 48° \quad (1)$$

$$45° < \alpha < 90° \quad (2).$$

5. The transflective liquid crystal display device according to claim 4, wherein, if an angle formed by an absorption axis of the second polarizing plate and a lag axis of the second half wave plate is assumed to be α' and an angle formed by the lag axis of the second half wave plate and the orientation direction of the liquid crystal molecules of the liquid crystal film is assumed to be β', then the second polarizing plate, the second half wave plate and the liquid crystal film are disposed to satisfy the following expressions (3) and (4):

$$42° \leq \beta' \alpha' \leq 48° \quad (3)$$

$$0° < \alpha' \leq 45° \quad (4).$$

6. The transflective liquid crystal display device according to claim 5, wherein if, among tilt directions of the liquid crystal layer, a tilt direction in an interface of the first substrate is assumed to be 90° and a counterclockwise direction is assumed to be positive when viewing the transflective liquid crystal display device from a visual confirmation side, then the first and second half wave plates and the first and second polarizing plates are disposed to satisfy the following expressions (5) to (8):

$$-180° < \text{an angle (°) of the lag axis of the first half wave plate} < 0° \quad (5)$$

$$42° \leq (\text{the angle (°) of the lag axis of the first half wave plate}) \times 2 - (\text{an angle) (°) of the absorption axis of the first polarizing plate}) \leq 48° \quad (6)$$

$$-90° < \text{an angle (°) of the lag axis of the second half wave plate} < 90° \quad (7)$$

$$132° \leq (\text{the angle (°) of the lag axis of the second half wave plate}) \times 2 - (\text{an angle (°) of the absorption axis of the second polarizing plate}) \leq 138° \quad (8).$$

7. The transflective liquid crystal display device according to claim 6, wherein the first and second half wave plates and the first and second polarizing plates are disposed to be in mirror-image relations in terms of the orientation direction of the liquid crystal molecules of the liquid crystal layer.

8. The transflective liquid crystal display device according to claim 1, wherein the second substrate further comprises:
   a transparent insulating substrate disposed on a side of the second substrate opposite the first substrate;
   a gate line and a gate electrode disposed on the transparent insulating substrate;
   a gate insulating film disposed on the gate line, the gate electrode and transparent insulating substrate;
   a semiconductor layer disposed on the gate insulating film;
   a data line and source electrode disposed on the gate insulating film and a part of the semiconductor layer;
   a drain electrode disposed on the gate insulating film and a part of the semiconductor layer; and
   a passivation film disposed on the gate insulating film, a part of the semiconductor layer, the drain electrode, the data line and the source electrode.

9. The transflective liquid crystal display device according to claim 8, wherein the second substrate further comprises an uneven film disposed on the passivation film.

10. The transflective liquid crystal display device according to claim 9, wherein a thickness of the liquid crystal layer in a reflection region comprises a thickness of a quarter wavelength and a thickness of the liquid crystal layer in a transmission region comprises a thickness of a half wavelength.

11. The transflective liquid crystal display device according to claim 9, wherein the second substrate further comprises:
a reflective film disposed on the uneven film; and
a transparent electrode disposed on the reflective film and the passivation layer.

12. The transflective liquid crystal display device according to claim 1, further comprising:
an orientation film disposed on a side of the first substrate closest to the second substrate; and
an other orientation film disposed on a side of the second substrate closest to the first substrate.

13. The transflective liquid crystal display device according to claim 3, wherein the first polarizing plate comprises an absorption axis of −158°, the first half wave plate comprises a lag axis of −58°, the quarter wave plate comprises a lag axis of 0°, the liquid crystal film comprises a tilt direction of −90°, the second half wave plate comprises a lag axis of −29° and the second polarizing plate comprises an absorption axis of −10°.

14. A transflective liquid crystal display device, comprising:
a first substrate;
a second substrate opposed to the first substrate, in which transmission and reflection regions are formed;
a liquid crystal layer interposed between the two substrates, which is homogeneous oriented;
a first optical anisotropic element including a first polarizing plate comprising an absorption axis of −158°, a first half wave plate comprising a lag axis of −58°, and a quarter wave plate comprising a lag axis of 0° which are disposed on a surface of the first substrate from a first substrate side, the surface being opposite to the liquid crystal layer; and
a second optical anisotropic element including a liquid crystal film which shows an optically positive uniaxiality and comprises a tilt direction of −90°, a second half wave plate comprising a lag axis of −29° and a second polarizing plate comprising an absorption axis of −10° which are disposed on a surface of the second substrate from a second substrate side, the surface being opposite to the liquid crystal layer,
wherein a nematic hybrid orientation in which a polymeric liquid crystal substance, formed in a liquid state of the liquid crystal film, is fixed and an optical axis of the quarter wave plate of the first optical anisotropic element is disposed to be orthogonal or substantially orthogonal to an optical axis of the liquid crystal film.

* * * * *